United States Patent [19]

Oe et al.

[11] Patent Number: 4,542,506
[45] Date of Patent: Sep. 17, 1985

[54] CONTROL SYSTEM HAVING A SELF-DIAGNOSTIC FUNCTION

[75] Inventors: Hidemi Oe, Tokyo; Kiyotaka Hayashi, Saitama, both of Japan

[73] Assignees: NEC Home Electronics Ltd., Osaka; Honda Giken Kogyo Kabushiki Kaisha, Tokyo, both of Japan

[21] Appl. No.: 393,323

[22] Filed: Jun. 29, 1982

[30] Foreign Application Priority Data

Jun. 30, 1981 [JP] Japan .................................. 56-100416
Jun. 30, 1981 [JP] Japan .................................. 56-100417
Jun. 30, 1981 [JP] Japan .................................. 56-100418

[51] Int. Cl.$^4$ ............................................. G06F 11/00
[52] U.S. Cl. ......................................... 371/9; 364/187
[58] Field of Search .................... 371/9; 364/200, 900, 364/185, 186, 187

[56] References Cited

U.S. PATENT DOCUMENTS

| | | | |
|---|---|---|---|
| 3,303,474 | 2/1967 | Moore et al. ........................ | 371/9 X |
| 3,786,433 | 1/1974 | Notley et al. ....................... | 371/9 X |
| 4,012,717 | 3/1977 | Censier et al. ...................... | 371/9 X |
| 4,133,027 | 1/1979 | Hogan ................................. | 371/9 X |
| 4,198,678 | 4/1980 | Maatje et al. ....................... | 371/9 X |
| 4,245,315 | 1/1981 | Barman et al. ...................... | 371/9 X |
| 4,270,168 | 5/1981 | Murphy et al. ...................... | 364/200 |
| 4,350,225 | 9/1982 | Sakata et al. ........................ | 371/9 X |
| 4,351,023 | 9/1982 | Richer ................................. | 364/187 |
| 4,432,048 | 2/1984 | Ito et al. ............................. | 364/187 |
| 4,437,154 | 3/1984 | Eisele et al. ......................... | 364/187 |

Primary Examiner—Charles E. Atkinson
Attorney, Agent, or Firm—Staas & Halsey

[57] ABSTRACT

The present invention includes a main control system driving an exciting coil of a component to be driven. The invention also includes a sub-control system that backs up the main control system when the main control system fails. The sub-control system and the main control system both have a self-diagnostic capability and the sub-control system is diagnosed for failure prior to the main control system, so that the availability of the back up system is determined before the main control system is activated.

4 Claims, 11 Drawing Figures

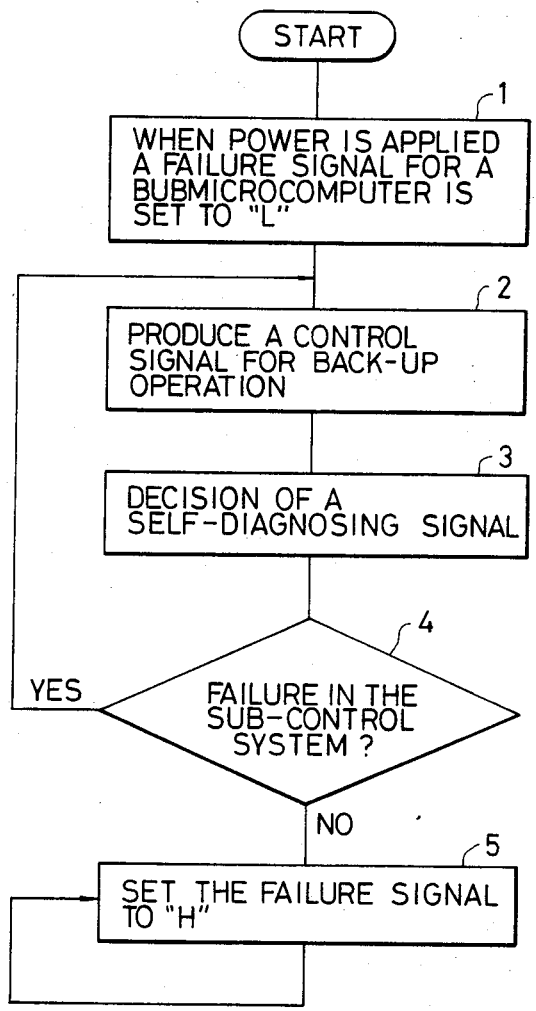

CONTROL SYSTEM HAVING A SELF-DIAGNOSTIC FUNCTION

BACKGROUND OF THE INVENTION

This invention relates to a control system which has a self-diagnostic function in which a sub-control circuit backs up a main control circuit when the main control circuit fails.

The rapid progress of electronic technology has been accompanied by the employment of electronic control systems in many types of devices. For security purposes electronic control systems must be highly reliable and, therefore, employ sub-control circuits which operate as a queued redundant system. The sub-control circuit is designed so that it operates as a backup control system when a main control circuit fails. FIG. 1 illustrates an example of a control circuit and a sub-control circuit using microcomputers.

In FIG. 1, a main microcomputer 1 receives data and outputs a control signal $A_1$ through an output port $O_{a1}$ based on the data received. The control signal $A_1$ operates a driving transistor $2a$ which excites a coil 4 through a normally closed contact $3a$ of relay 3. The coil 4 can be used to drive or control controllable elements. The main microcomputer 1 samples a potential through an input port $P_{a1}$ at a point between transistor $2a$ and contact $3a$, and uses the potential as a diagnostic signal $B_1$. When the logical relationship between the control signal $A_1$ and the diagnostic signal $B_1$ does not satisfy a predetermined condition, the main microcomputer 1 detects that the transistor $2a$ or coil 4 is abnormal and outputs a failure signal $C_1$ through an output port $O_{a2}$. The failure signal $C_1$ activates relay 3 to switch the contacts $3a$ and $3b$, thus connecting the coil 4 to a transistor $2b$ of a sub-control system. When a sub-microcomputer 5 receives the failure signal $C_1$ through input port $P_{b2}$, the sub-microcomputer 5, which is in a standby state and receives the same input data as that applied to the main microcomputer 1, starts to control the excitation operation. The sub-microcomputer 5, based on the input data, outputs a control signal $A_2$ through output port $O_{b1}$ to control the transistor $2b$. The transistor $2b$ controls the coil 4 through the contact $3b$. Thus, the sub-control system, including the sub-microcomputer 5 and the transistor $2b$, backs up the main control system, including the main microcomputer 1 and transistor $2a$.

When the transistor $2b$ of the sub-control system fails, the sub-microcomputer 5, using the diagnostic signal $B_2$ input through input port $P_{b1}$, detects the non-coincidence of the control signal $A_2$ and the diagnostic signal $B_2$. When the non-coincidence is detected the sub-microcomputer 5 outputs a failure signal $C_2$ through output port $O_{b2}$. When the failure signal $C_2$ is produced an alarm device 6 is activated and informs an operator that both the sub-control system and the main control system are out of order.

Self-diagnosis takes place in the subcontrol system only after trouble occurs in the main control system. Therefore, the above-described self diagnostic method is only effective when the main control system fails and the sub-control system is activated as a backup. Thus, when the transistor $2b$ fails before the backup operation is initiated the sub-control circuit is out of order before the backup operation is required. In this situation the failure signal $C_2$ is produced immediately, the alarm device 6 is activated and the sub-control system provides no backup function for the main control system. The above-described queued redundant system operates on the premise that the sub-control system functions normally at all times. The above-described sub-control system cannot be employed for electronic devices on vehicles which must be very high in reliability.

SUMMARY OF THE INVENTION

An object of this invention is to provide a control system with a self-diagnostic function.

Another object of this invention is to provide a control system which has a self diagnostic function for both a main control system and a sub-control system.

An additional object of this invention is to provide a sub-control system with a self disgnostic function which operates in a standby state.

It is a further object of this invention to provide a control system with high reliability.

It is another object of this invention to provide a secure and reliable vehicle control system.

The present invention provides a control system which includes a reset signal generating circuit. The reset signal generating circuit controls a reset control operation in the sub-control svstem while the sub-control system is in a self-diagnostic mode. The sub-control system includes a sub-microcomputer which is finally released from a reset state after both a main microcomputer of a main control system and the sub-microcomputer are reset. The main control system also includes a self-diagnostic mode which initiates a backup operation by the sub-control system when the main control system malfunctions. The control system also includes an alarm circuit for detecting a failure signal generated by the sub-microcomputer while it is in the self diagnostic mode.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is a flow chart illustrating a self diagnostic process of the sub-control system.

DESCRIPTION OF THE PREFERRED EMBODIMENT

A control system having a self-diagnostic function according to the present invention will be described with reference to FIGS. 2–11.

Figure 1:
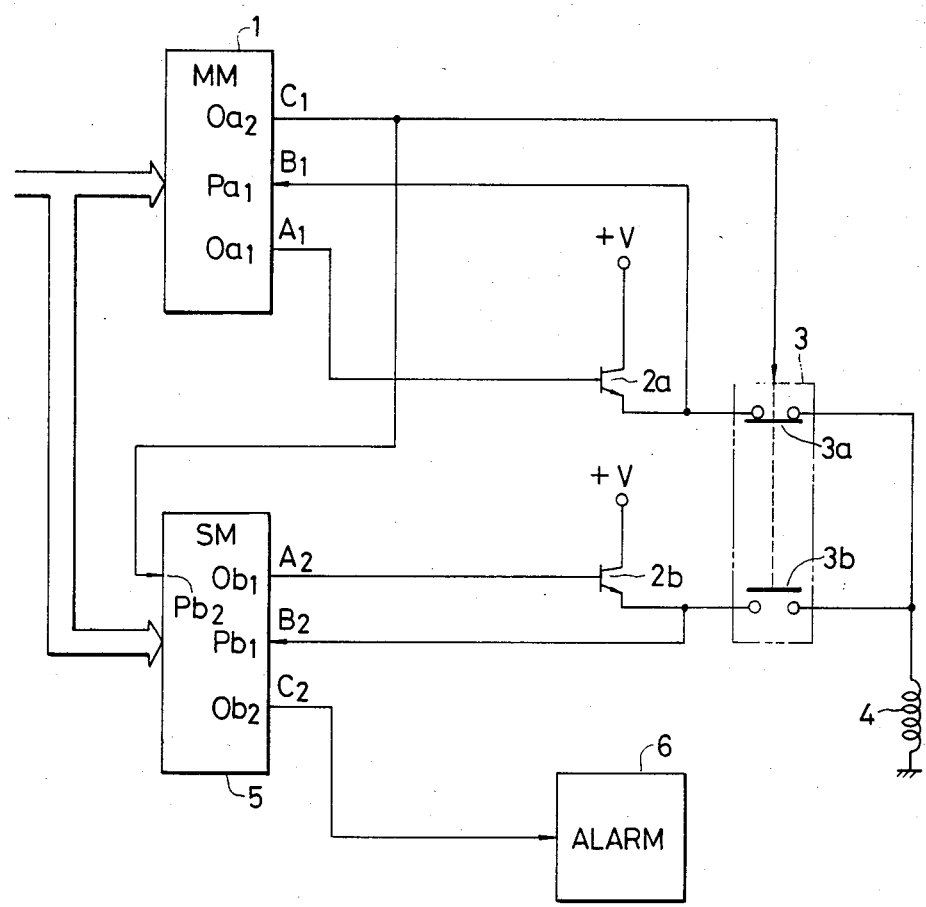
FIG. 1 is a circuit diagram illustrating an example of a control system having a sub-control system.
Figure 2:
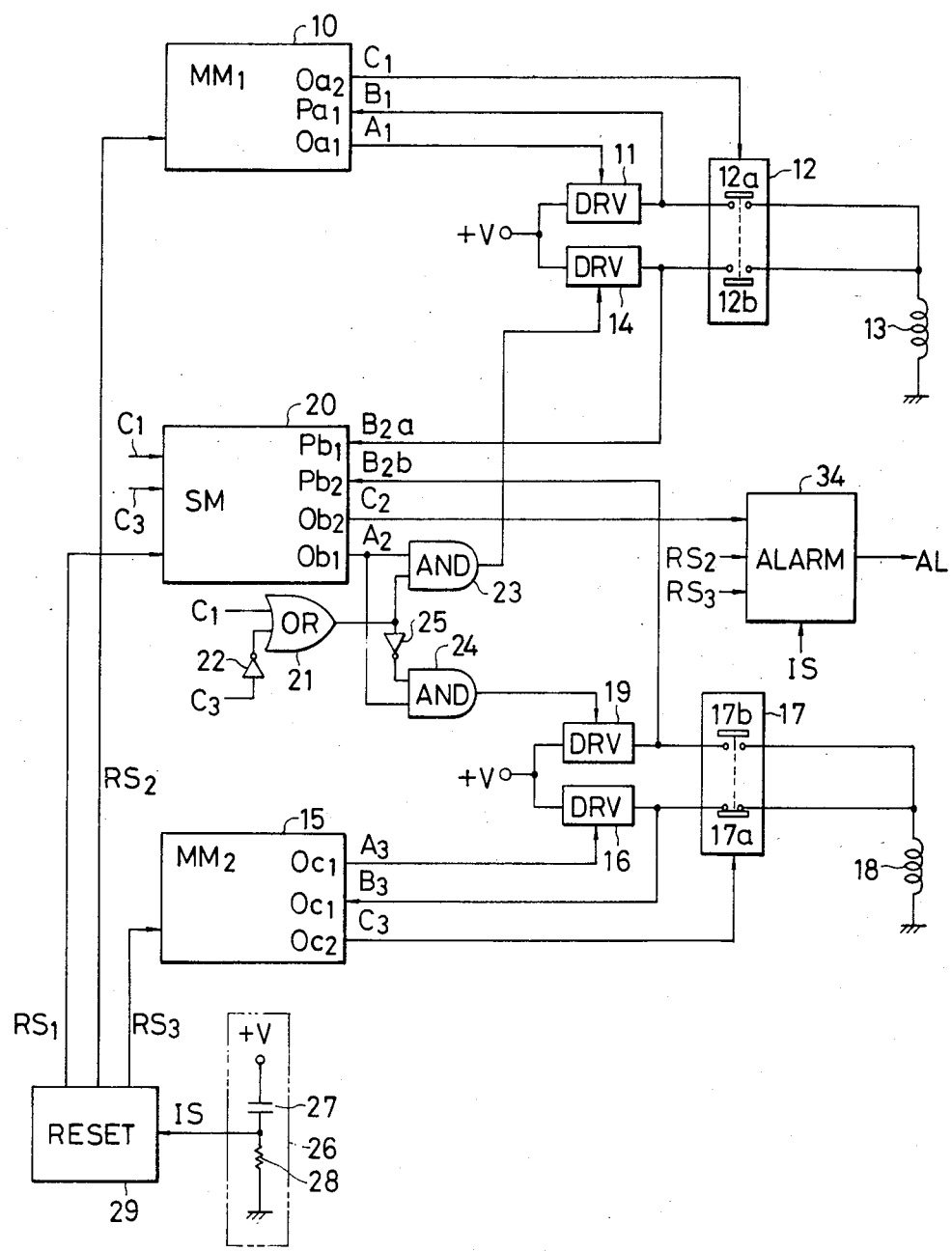
FIG. 2 is a circuit diagram an embodiment of a self diagnostic device of a sub-control system according to the present invention.

FIG. 2 illustrates an example of a control system with self-diagnostic functions, according to the present invention, applicable in a situation where a sub-control system backs up two main control systems. A first main microcomputer 10 outputs a control signal $A_1$ through an output port $O_{a1}$ which operates a driver 11. The driver 11 is connected to a +V power source and to an exciting coil 13 through a contact 12a of a relay 12. The driver 11 drives the exciting coil 13 of an element to be controlled. The first main microcomputer 10 samples a diagnositic signal $B_1$ through an input port $P_{a1}$ at a point between the driver 11 and the relay contact 12a. The microcomputer 10 compares the diagnostic signal $B_1$ with the control signal $A_1$ to detect a predetermined logical non-coincidence which indicates that either the exciting coil 13 or a transistor in the driver 11 is malfunctioning. When the abnormality is detected the first main microcomputer 10 generates a failure signal $C_1$ which activates the relay 12. The failure signal $C_1$ breaks and makes the contacts 12a and 12b, respectively, in the relay 12, thus connecting the exciting coil 13 to a driver 14.

As in the case of the first main microcomputer 10, a second main microcomputer 15, which is part of a second main control system, outputs a control signal $A_3$ through an output port $O_{c1}$ to control a driver 16. The driver 16 connects a +V power source through a normally closed contact 17a of the relay 17 to an exciting coil 18 The exciting coil 18 is part of an element that is to be driven and controlled. The second main microcomputer 15 samples a diagnostic signal $B_3$ through an input port $O_{c1}$ at a point between the driver 16 and the exciting coil 18. The diagnostic signal $B_3$ is used to detect whether either the exciting coil 18 or a transistor in the driver 16 is malfunctioning. A failure signal $C_3$ output through an output port $O_{c2}$ drives the relay 17 which breaks and makes the contacts 17a and 17b, respectively, so that the exciting coil 18 is connected to a driver 19.

The sub-microcomputer 20, which is a part of a queued redundant sub-control system, outputs the control signal $A_2$ through an output port $O_{b1}$ when it receives the failure signal $C_1$ from the first main microcomputer 10 or the failure signal $C_3$ from the second main microcomputer 15. A signal control means including an OR gate 21 also receives the failure signal $C_1$ and the failure signal $C_3$ after it passes through an inverter 22. An AND gate 23 of the signal control means receives the control signal $A_2$ and the output from the OR gate 21 and operates the driver 14. An AND gate 24 of the signal control means receives the control signal $A_2$ and the output from the OR gate 21 after it passes through an inverter 25, and operates the driver 19. The sub-microcomputer 20 receives, as a diagnostic signal $B_{2a}$, a potential sampled at a point between the driver 14 and the contact 12b. The sub-microcomputer 20 also receives, as a diagnostic signal $B_{2b}$, a potential sampled at a point between the driver 19 and the contact 17b. The sub-microcomputer 20 receives the diagnostic signals $B_{2a}$ and $B_{2b}$ through input ports $P_{b1}$ and $P_{b2}$, respectively. When the sub-microcomputer 20 detects the failure signals $C_1$ or $C_3$ and the predetermined non-coincidence logical relationship of the diagnostic signals $B_{2a}$ or $B_{2b}$ with respect to the control signal $A_2$, the sub-microcomputer 20 generates a failure signal $C_2$.

An initial signal generating circuit 26 generates an initial signal IS when power is turned on in the initial signal generating circuit 26. The initial signal generatinq circuit 26 is a series circuit of a capacitor 27 and a resistor 28. When the initial signal IS is received by a reset signal generating circuit 29, the reset signal generating circuit 29 outputs reset signals $RS_1$, $RS_2$ and $RS_3$. The reset signals $RS_1$, $RS_2$ and $RS_3$ are supplied to the sub-microcomputer 20, the first main microcomputer 10 and the second main microcomputer 15 during a predetermined queued redundant system diagnostic mode.

Figure 3:
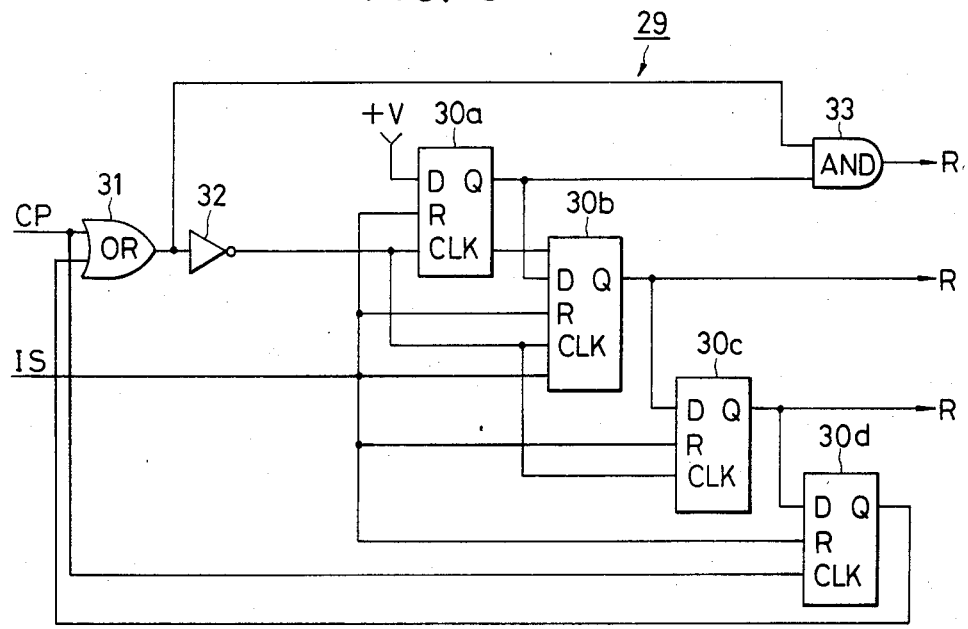
FIG. 3 is a circuit diagram of an example of the reset signal generating circuit 29 illustrated in FIG. 2.

As illustrated in FIG. 3, the reset signal generating circuit 29 includes four D-type flip-flop circuits 30a–30d of which a set output Q of a previous flip-flop is connected to a D input of a succeeding flip-flop. The flip-flop circuits 30a–30d are reset by the initial signal IS. The reset signal generating circuit 29 also includes an OR gate 31 which receives clock pulses CP and an output produced by the set output Q of the flip-flop 30d. The reset signal generating circuit 29 further includes an inverter 32 connected between OR gate 31 and the clock inputs CLK of the the flip-flop circuits 30a–30d. The reset signal generating circuit 29 additionally includes an AND gate 33 connected to the output of the OR gate 31 and the set output Q of the flip-flop 30a. The AND gate 33 generates the reset signal $RS_1$. The reset signals $RS_2$ and $RS_3$ are output from the set outputs Q of the flip-flop circuits 30b and 30c, respectively.

Alarm circuit 34, illustrated in FIG. 2, receives the failure signal $C_2$ output by the sub-microcomputer 20 and the reset signals $RS_2$ and $RS_3$ output by the reset signal generating circuit 29. The alarm circuit 34 detects an abnormal condition or malfunction in the sub-control system, which is the queued redundant system, and outputs an alarm signal AL.

Figure 4:
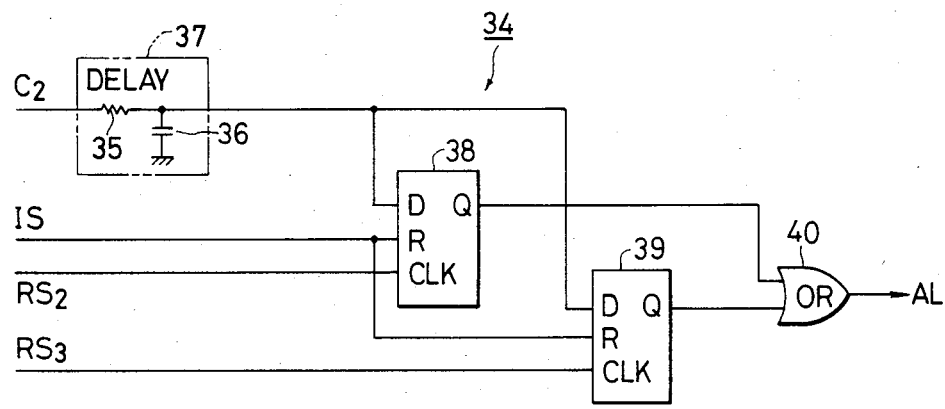
FIG. 4 is a circuit diagram of an example of the alarm circuit 34 illustrated in FIG. 2.
Figure 5:
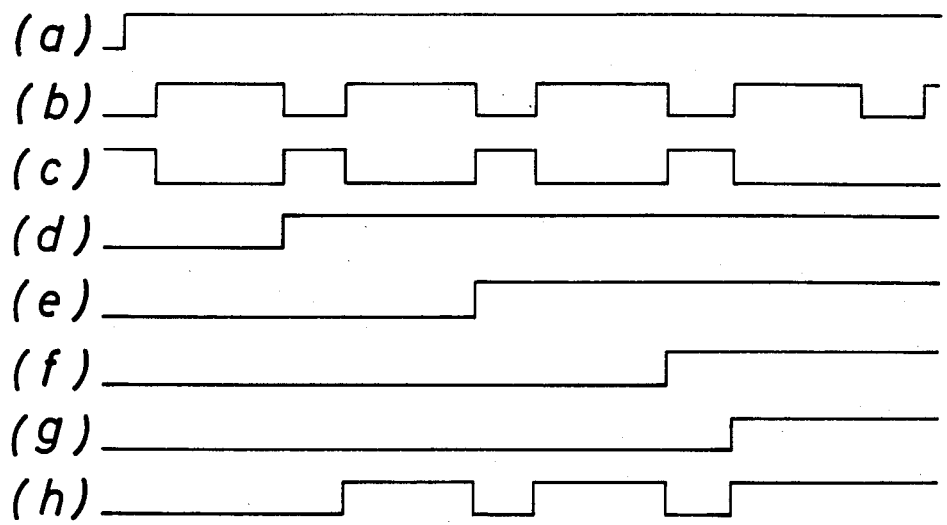
FIGS. 5–10 are wave form diagrams of the signals in the circuits illustrated in FIG. 2.

The alarm circuit 34, as illustrated in FIG. 4, includes a delay circuit 37 of an integrator type, which includes a resistor 35 and a capacitor 36, for delaying the failure signal $C_2$. A flip-flop circuit 38 receives the delayed failure signal $C_2$ output by the delay circuit 37 through a D input terminal and the reset signal $RS_2$ through a clock input terminal CLK. The alarm circuit 34 also includes flip-flop circuit 39 which also receives the delayed failure signal $C_2$ through a D input terminal and the reset signal $RS_3$ through a clock input terminal CLK. An OR gate 40, included in the alarm circuit 34, receives the set outputs Q from the flip-flops 38 and 39 and outputs the alarm signal AL.

In the above-described circuits, when a power switch (not shown) is turned on, the +V power source is applied to the initial signal generating circuit 26 and generates the initial signal IS as illustrated in FIG. 5(a). After the reset signal generating circuit 29 is activated by the initial signal IS, the reset signals $RS_1$, $RS_2$ and $RS_3$ are generated. When the sub-microcomputer 20, the first main microcomputer 10 and the second main microcomputer 15, which are in a predetermined mode, receive the reset signals, the self-diagnostic mode of the sub-microcomputer 20, comprising the queued redundant system, is established.

The operation of the reset signal generating circuit 29 will be described before describing the operation of the queued redundant system in the self-diagnostic mode.

When the initial signal IS is supplied to the reset signal generating circuit 29, illustrated in FIG. 3, the flip-flop circuits 30a–30d are reset. When the +V power source is activated in the initial signal generating circuit 26, a clock pulse oscillator (not shown) is also turned on, so that a clock pulse CP (illustrated in FIG. 5(b)) is applied to one of the input terminals of the OR gate 31. The clock pulse CP which passes through the OR gate 31 is inverted by the inverter 32, as illustrated in FIG. 5(c). The clock pulse CP after inversion is input through the clock input terminal CLK of the flip-flop circuit 30a. Because the input terminal of the flip-flip 30a is connected to the +V power source, the flip-flop 30a is set by the rising edge of the clock pulse CP and the output produced by the set output Q rises, as illustrated in FIG. 5(d). The output produced from the set output Q of the flip-flip 30a is applied to the D input terminal of the flip-flop circuit 30b. Therefore, if the D input of the flip-flop 30b is at a high level, then at the next rising edge of the clock pulse CP, as illustrated in FIG. 5(c), the set output of the flip-flop 30b rises, as illustrated in FIG. 5(b). In a similar manner, the output produced by the Q output of the flip-flip 30c rises at the leading edge of the third clock pulse CP, as illustrated in FIG. 5(f). The set output Q of the flip-flop 30c is connected to the D input terminal of flip-flop circuit 30d. Therefore, the flip-flop 30d is set at the rising edge of the fourth clock pulse CP, as illustrated in FIGS. 5(b) and 5(g). The set output Q of the flip-flop circuit 30d is connected to the other input terminal of the OR gate 31 which results in the output of the OR gate 31 being maintained at the high level while the output produced by the inverter 32 is maintained at the low level. Accordingly, the set outputs Q of the flip-flop circuits 30a–30d are maintained at the high level.

The AND gate 33 receives the output produced by the OR gate 31 and that produced by the set output Q of the flip-flop circuit 30a. During the time between the instant when the flip-flop circuit 30a is set until the flip-flop circuit 30d is set, the AND gate 33 produces a pulse output, as illustrated in FIG. 5(h), which is synchronized with the output of the OR gate 31. When the flip-flop circuit 30d is set the output produced by AND gate 33 is held at the high level.

The output produced by the AND gate 33 is used as the reset signal $RS_1$, the output produced by the set output Q of the flip-flop circuit 30b is used as the reset signal $RS_2$ and the output produced by the set output Q of the flip-flop 30c is used as the reset signal $RS_3$.

As illustrated in FIGS. 5(h), 5(e) and 5(f) the reset signals $RS_1$–$RS_3$ change during first through fourth modes as illustrated in Table 1 below whenever the clock pulse CP occurs, and the levels of the reset signals are held at the levels obtained in the fourth mode thereafter.

TABLE 1

| MODE | $RS_1$ | $RS_2$ | $RS_3$ |
|---|---|---|---|
| 1 | L | L | L |
| 2 | H | L | L |
| 3 | H | H | L |
| 4 | H | H | H |

Where H equals the high level and L equals the low level.

Figure 6:
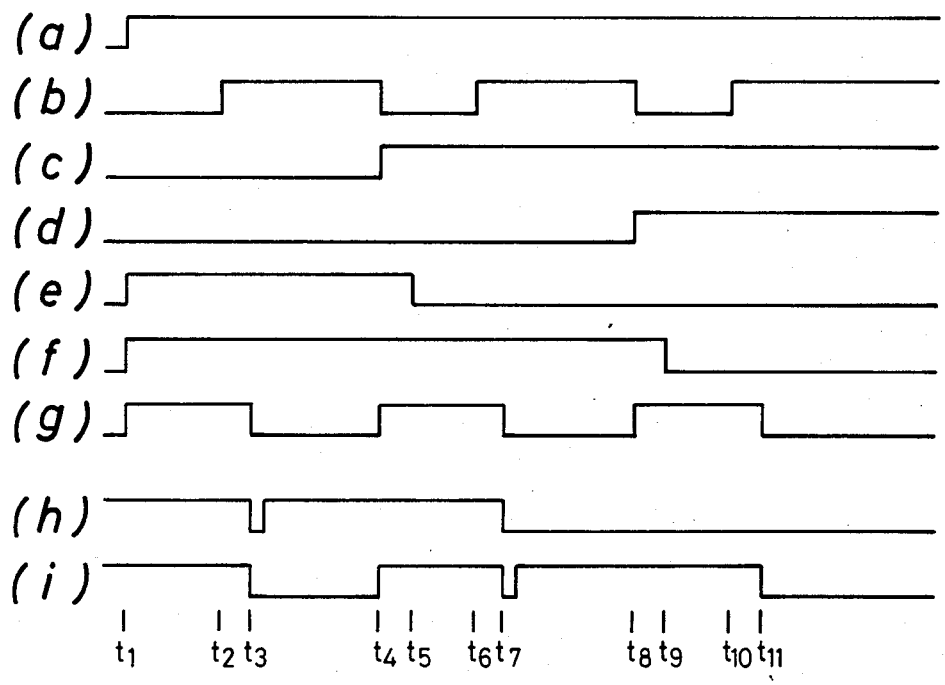
Figure 7:
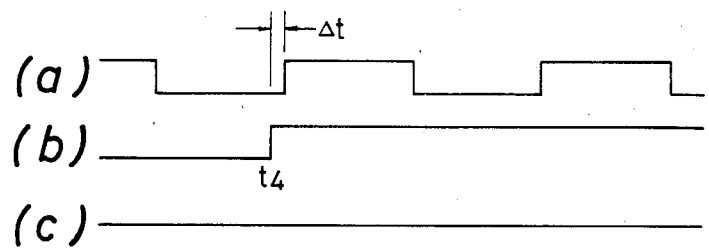
Figure 8:
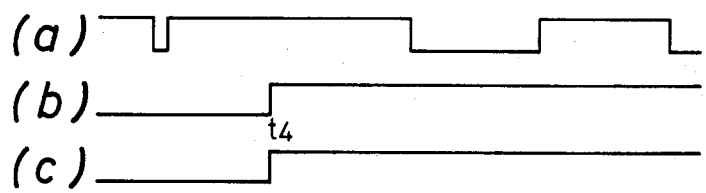
Figure 9:
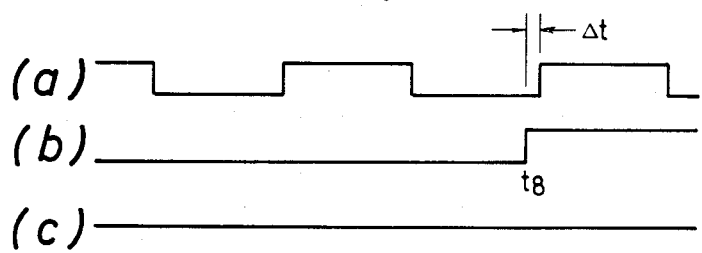
Figure 10:
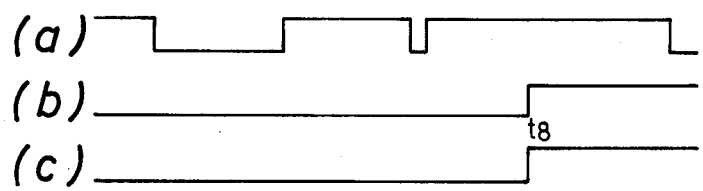

As illustrated in Table 1 above, when the initial signal IS is supplied to the reset signal generating circuit 29, illustrated in FIG. 3, the reset signals $RS_1$–$RS_3$ are set to the low level, so that the sub-microcomputer 20 and the first and second main microcomputers 10 and 15 are reset. Thereafter, the reset states of the microcomputers are released sequentially, beginning with the sub-microcomputer 20 which forms the queued redundant system, each time a clock pulse CP is applied. The sub-microcomputer is temporarily reset at the beginning of the third and fourth modes, as illustrated in FIG. 6.

The self-diagnostic operation of the queued redundant system beginning at the application of power will be described. When the +V power source is turned on at the time $t_1$, as illustrated in FIG. 6(a), the reset signals $RS_1$–$RS_3$ are at the levels illustrated in FIG. 6(b), 6(c) and 6(d). In the first mode, during the period $t_1$–$t_2$, the reset signals $RS_1$–$RS_3$ are at the low level, as illustrated in Table 1, and the sub-microcomputer 20 and the first and second microcomputers 10 and 15 are reset. While these microcomputers 20, 10 and 15 are reset the failure signals $C_2$, $C_1$ and $C_3$ are at the high level, as illustrated in FIG. 6(e), 6(f) and 6(g), which indicates the detection of a malfunction. At the time instant $t_2$, the reset signal $RS_1$ is raised to the high level, as illustrated in FIG. 6(b), and the reset state of the sub-microcomputer 20 is released. In the second mode, during the period $t_2$–$t_3$, while the sub-microcomputer 20 is not in the reset state, the sub-microcomputer 20 receives the failure signals $C_1$ and $C_3$ from the first and second main microcomputers 10 and 15 and generates the control signal $A_2$, thereby causing the backup operation to occur. If, as in this case, the failure signals $C_1$ and $C_3$ are produced at the same time, the failure signal $C_1$ takes precedence, because the failure $C_3$ is inverted by the inverter 22. The output of the AND gate 23 is raised to the high level and the driver 14 is operated. Since the failure signal $C_1$ also operates the relay 12, the contacts 12a and 12b are switched and the exciting coil 13 is driven by the output of the driver 14, rather than being driven by the first main microcomputer 10.

The potential between the driver 14 and the contact 12b is sampled as the diagnostic signal $B_{2a}$ by the sub-microcomputer 20. Sub-microcomputer 20 diagnoses the condition of the driver 14 and the exciting coil 13 with respect to the control signal $A_2$. When the diagnostic result indicates that the driver 14 or the exciting coil 13 is normal, the failure $C_2$ is set to the low level as indicated in the period $t_3$–$t_4$ in FIG. 6(g). If an abnormal condition is detected, such as a breakage of the coil 13 or a bad driver 14, a failure signal $C_2$ is set to the low level momentarily as indicated in the period $t_3$–$t_4$ in FIG. 6(h), and is then held at the high level.

In the third mode, at the time $t_4$, as illustrated in FIGS. 6(b) and 6(c), the reset signal $RS_1$ is set to the low level resetting the sub-microcomputer 20, while the reset signal $RS_2$ is raised to the high level. Therefore, the reset state of the first microcomputer 10 is released and the reset state of the second main microcomputer 15 is maintained. During the period $t_4$–$t_5$ a diagnosis of the driver 11 and the exciting coil 13 is performed. When the diagnostic result indicates that the driver 11 and the exciting coil 13 are both normal, the failure signal $C_1$ is set to the low level at the time $t_5$, as illustrated in FIG. 6(e).

At the time $t_6$, the reset signal $RS_1$ is set to the high level and only the second main microcomputer 15 is in the reset state. Accordingly, at the time $t_6$ only the failure signal $C_3$ is at the high level, as illustrated in FIG. 6(f), and the sub-microcomputer 20 starts the backup operation for the second main microcomputer 15 by generating the control signal $A_2$. The failure signal $C_3$ is at the high level and therefore the output of the inverter 22, at the low level, is supplied through the OR gate 21 to the AND gate 24 via the inverter 25. Thus, the control signal $A_2$ drives the driver 19 through the AND gate 24. The contacts 17a and 17b of the relay 17 are also operated by the failure $C_3$, so that the exciting coil 18 is driven by the output of the driver 19.

The sub-microcomputer 20 samples, as the diagnostic signal $B_{2b}$, the potential at a point between the driver 19 and the contact 17b. If the diagnostic signal $B_{2b}$ indicates a normal operation with respect to the control signal $A_2$, the sub-microcomputer 20 generates a low level signal as the failure signal $C_2$ during the period $t_7$–$t_8$, as illustrated in FIG. 6(g). If the diagnostic signal $B_{2b}$ indicates an abnormal operation, the sub-microcomputer 20 provides the failure signal $C_2$ at the high level, which set to the low level momentarily during the period $t_7$–$t_8$, as illustrated in FIG. 6(i).

In the fourth mode, at the time $t_8$, the reset $RS_1$ is set to the low level temporarily while the reset $RS_3$ is raised to the high level, and therefore, only the sub-microcomputer 20 is reset. The second main microcomputer 15 carries out the self diagnostic operation during the period $t_8$–$t_9$. If the self diagnostic signal indicates a normal operation, the failure signal $C_3$ is set to the low level at the time $t_9$, as illustrated in FIG. 6(f).

At the time $t_{10}$ the reset signal $RS_1$ is raised to the high level as illustrated in FIG. 6(b), and the reset state of the sub-microcomputer 20 is released. Thus, all the self-diagnostic operations of the queued redundant systems have been accomplished and all the microcomputers are in a normal operating state. In the self-diagnosis mode, operating currents are supplied to the exciting coils 13 and 18. However, since the self-diagnosis is achieved in a very short time, the elements to be controlled by the exciting coils 13 and 18 are not driven by the operating currents, that is, no adverse affects are caused by the operating currents flowing during the self-diagnosis mode.

Thus, the failure signal $C_2$ which represents the condition of the sub-control system is applied to alarm circuit 34. The alarm circuit 34 detects the wave forms during the periods $t_3$–$t_4$, as illustrated in FIG. 6(h), or during the time period $t_7$–$t_8$, as illustrated in FIG. 6(i), to produce the alarm signal AL.

An alarm circuit 34 discrimination operation will be described with reference to FIG. 4 and FIGS. 7–10.

When the initial signal IS generated by the initial signal generating circuit 26 (FIG. 2) is supplied to the flip-flops 38 and 39, illustrated in FIG. 4, they are reset. The failure signal $C_2$ output by the sub-microcomputer 20 through the output port $O_{b2}$ (FIG. 2), and is applied to the D input terminals of the flip-flop circuits 38 and 39 (FIG. 4) after being delayed by the delay circuit 37 for a time period $\Delta T$. The reset signals $RS_2$ and $RS_3$ are applied to the clock input terminals CLK of the flip-flop circuits 38 and 39, respectively. The flip-flop circuits 38 and 39 carry out the discrimination operation based on the presence or absence of the failure signal $C_2$ which is supplied through the delay circuit 37 during the period that the high level reset signals $RS_2$ and $RS_3$ are supplied. When the failure signal $C_2$, during a normal period, is supplied to the flip-flop circuits 38 and 39 after being delayed by the delay circuit 37 for the time $\Delta T$, as illustrated in FIG. 7(a), the input signal applied to the D terminal of the flip-flop circuit 38 is at the low level, i.e., being delayed as illustrated in FIG. 7(a), at the time $t_4$ when the reset signal $RS_2$ rises, as illustrated in FIG. 7(b). Accordingly, the flip-flop circuit 38 is not set and the set output Q is maintained at the low level. Therefore, no high level alarm signal AL is output by OR gate 40, as illustrated in FIG. 7(c).

When a failure signal $C_2$, as illustrated in FIG. 6(h), indicating the abnormal condition of the driver 14 or the exciting coil 13 during the period $t_2$–$t_7$, is supplied to the D input terminals of the flip-flop circuits 38 and 39 via the delay circuit 37, as illustrated in FIG. 8(a), the flip-flop circuit 38 is reset at the time $t_4$ when the reset signal $RS_2$ rises. Thus, the set output Q of the flip-flop circuit 38 outputs through the OR gate 40 the high level of the alarm signal AL signalling that the queued redundant system is abnormal, as illustrated in FIG. 8(c).

When the failure signal $C_2$, indicating the normal operation of the driver 19 and the exciting coil 18, is supplied to the alarm circuit, the low level of the failure signal $C_2$ is delayed at the time $t_8$, as illustrated in FIG. 9(a). The failure signal $C_2$ is at a low level when the reset signal $RS_3$ rises and is raised to the high level, as illustrated in FIG. 9(b). Therefore, the flip-flop circuit 39 is not set and the output produced by the OR gate 40 is maintained at the low level, as illustrated in FIG. 9(c).

When the driver 19 and the exciting coil 18 are malfunctioning the failure signal $C_2$ is supplied through the delay circuit 37, as illustrated in FIG. 10(a). The failure signal $C_2$ is at the high level at the time $t_8$ when the reset signal $RS_3$ rises and is raised to the high level, and therefore, the flip-flop circuit 39 is set as illustrated in FIG. 10(b). As a result, the OR gate 40 which receives the output produced by the set output Q of the flip-flop circuit 39 outputs the high level of the alarm signal AL, as illustrated in FIG. 10(c), signalling that the queued redundant system is abnormal.

FIG. 11 is a flow chart illustrating the self-diagnostic operation of the queued redundant system. Block 1 indicates that when the power is applied, one of the failure signals generated by the main control systems is set to the low level. Block 2 indicates that the sub-control system produces a control signal causing the backup operation for one of the main control systems to begin. Block 3 indicates that the sub-control system performs the self-diagnostic operation and block 4 is a branch box in which the branch selected depends upon the diagnostic result. Block 5 indicates that the sub-control system for the backup operation for the main microcomputer system is performing normally and the failure signal is set to the high level.

The backup operation for the first or second main microcomputer 10 or 15 by the sub-microcomputer 20 will be described. When the driver 11 fails, i.e., becomes abnormal, the first main microcomputer 10 detects the abnormal condition of the diagnostic signal $B_1$ with respect to a control signal $A_1$ and outputs a failure signal $C_1$. When failure signal $C_1$ is output, the relay 12 is activated, and the exciting coil 13 is connected to the driver 14 in the sub-control system. Furthermore, on the production of the failure signal $C_1$, the sub-microcomputer 20 produces the control signal $A_2$. Since the output of the OR gate 21 has been raised to the high level by the failure signal $C_1$ the control signal $A_2$ is passed through the AND gate 23 to the driver 14. Thus, the driver 14 is operated by the control signal $A_2$ and the exciting coil 13 is driven by the output of the driver 14 and the backup operation is accomplished. This backup operation is similarly performed for the second main microcomputer 15. When the first and second main microcomputers 10 and 15 provide the failure signals $C_1$ and $C_2$ at the same time, the first main microcomputer 10 takes precedence in the backup operation over the second main microcomputer 15 because of the signal control means including the OR gate 21, the inverters 22 and 25, and the AND gates 23 and 24.

In the above described embodiment, there is only one queued redundant system, i.e. one sub-microcomputer 20, which backs up two main control systems. However, it should be noted that the number of main control systems can be selected as desired.

As is apparent in the above description, in the control system according to the present invention, when the power is turned on, the main control systems and the sub-control system are reset. Then the reset state of the sub-control system is released so that a failure signal is produced by one of the main control systems in order to momentarily cause a backup operation. During this backup operation, self-diagnostics are performed by the sub-control system under predetermined conditions. Thus, whenever the power source is turned on, the self-diagnostic functions of the sub-control system are effected. As can be seen from the above description, the present control system having the self-diagnostic function is simple in arrangement and high in reliability.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope of the invention.

We claim:

1. A control system operatively connectable to receive a clock signal and an initial signal when the power is turned on, comprising:
   a reset signal generating circuit for generating first and second reset signals when the power is turned on, said reset signal generating circuit comprising:
   an OR gate operatively connectable to receive the clock signal;
   an inverter operatively connected to said OR gate;
   a first flip-flop operatively connected to said inverter and operatively connectable to receive the initial signal;
   a second flip-flop, operatively connected to said inverter and said first flip-flop and operatively connectable to receive the initial signal, for generating the second reset signal;
   a third flip-flop operatively connected to said second flip-flop and said inverter and operatively connectable to receive the initial signal;
   a fourth flip-flop operatively connected to said third flip-flop and said OR gate and operatively connectable to receive the clock signal and the initial signal; and
   an AND gate, operatively connected to said OR gate and said first flip-flop, for generating the first reset signal;
   main control system means, operatively connected to said reset signal generating circuit, for generating a first failure signal in dependence upon a diagnostic test initiated by the second reset signal;
   sub-control system means, operatively connected to said main control system means and said reset signal generating circuit, for performing sub-control system diagnostics in dependence upon the first reset signal and the first failure signal and for generating a second failure signal in dependence upon the sub-control system diagnostics and the first failure signal; and
   an alarm circuit, operatively connected to said reset signal generating circuit and said sub-control system means, for generating an alarm signal in dependence upon the second reset signal and the second failure signal.

2. A control system as recited in claim 1, wherein said alarm circuit comprises:
   a delay circuit operatively connected to said sub-control system means;
   a pair of flip-flops operatively connected to said delay circuit and to said second and third flip-flops, respectively, of said reset signal generating circuit and operatively connectable to receive the initial signal; and
   an OR gate, operatively connected to said pair of flip-flops, for generating the alarm signal.

3. A control system operatively connectable to receive an initial signal when the power is turned on, and comprising:
   a reset signal generating circuit for generating first and second reset signals when the power is turned on;
   main control system means, operatively connected to said reset signal generating circuit, for generating a first failure signal in dependence upon a diagnostic test initiated by the second reset signal;
   sub-control system means, operatively connected to said main control system means and said reset signal generating circuit, for performing sub-control system diagnostics in dependence upon the first reset signal and the first failure signal and for generating a second failure signal in dependence upon the sub-control system diagnostics and the first failure signal; and
   an alarm circuit, operatively connected to said reset signal generating circuit and said sub-control system means, for generating an alarm signal in dependence upon the second reset signal and the second failure signal, said alarm circuit comprising:
   a delay circuit operatively connected to said sub-control system means;
   a pair of flip-flops operatively connected to said delay circuit and said reset signal generating circuit to receive the reset signals and operatively connectable to receive the initial signal; and
   an OR gate, operatively connected to said pair of flip-flops, for generating the alarm signal.

4. A control system as recited in claim 1, 2, or 3, wherein said sub-control system means comprises:
   a driver for generating a diagnostic signal;
   a processor, operatively connected to said driver, said main control system means and said reset signal generating circuit, for generating the second failure signal in dependence upon the diagnostic signal and the first failure signal and for generating a first control signal in dependence upon the first failure signal and the first reset signal; and
   signal control means, operatively connected to said processor and said main control system means, for generating a second control signal in dependence upon the first control signal and the first failure signal, said driver being activated by the second control signal.

* * * * *